US009987831B2

(12) United States Patent
Cerveny et al.

(10) Patent No.: US 9,987,831 B2
(45) Date of Patent: Jun. 5, 2018

(54) METHOD FOR THE FABRICATION OF A PREFORM, PREFORM AND CONTAINER

(71) Applicant: NESTEC S.A., Vevey (CH)

(72) Inventors: Jean-Paul Cerveny, Vittel (FR); Nicolas Dabrowski, Vittel (FR); Christian Detrois, Epalinges (CH); Emmanuel Laine, Vittel (FR); Erik Lupke, KB The Hague (NL)

(73) Assignee: Nestec S.A., Vevey (CH)

( * ) Notice: Subject to any disclaimer, the term of this patent is extended or adjusted under 35 U.S.C. 154(b) by 578 days.

(21) Appl. No.: 14/414,756

(22) PCT Filed: Jul. 25, 2013

(86) PCT No.: PCT/EP2013/065729
§ 371 (c)(1),
(2) Date: Jan. 14, 2015

(87) PCT Pub. No.: WO2014/019936
PCT Pub. Date: Feb. 6, 2014

(65) Prior Publication Data
US 2015/0217554 A1 Aug. 6, 2015

(30) Foreign Application Priority Data
Aug. 3, 2012 (EP) ..................................... 12179128

(51) Int. Cl.
*B32B 37/00* (2006.01)
*B32B 37/24* (2006.01)
(Continued)

(52) U.S. Cl.
CPC .............. *B32B 37/24* (2013.01); *B29B 11/04* (2013.01); *B29B 11/14* (2013.01); *B29C 65/08* (2013.01);
(Continued)

(58) Field of Classification Search
CPC ..... B32B 37/24; B32B 37/0046; B32B 37/06; B32B 37/18; B29C 65/08; B29C 66/1222;
(Continued)

(56) References Cited

U.S. PATENT DOCUMENTS 5,622,579 A * 4/1997 Tobias ................... B29C 65/08
156/285
5,861,072 A * 1/1999 Medal ..................... B29C 65/08
156/309.6

(Continued)

FOREIGN PATENT DOCUMENTS

EP 0503086 9/1992
EP 1880824 1/2008
(Continued)

*Primary Examiner* — James Sells
(74) *Attorney, Agent, or Firm* — K&L Gates LLP

(57) ABSTRACT

A method for fabricating a preform (100) by providing a plurality of preform segments (101-103) which each define a portion of a preform (100), positioning said preform segments (101-103) in continuous contact with each other along at least one edge of said preform segments (101-103) such that said plurality of preform segments (101-103) define a cavity (107), and bonding each of said preform segments (101-103) to at least one other preform segment such that said plurality of preform segments (101-103) forms a continuous whole.

5 Claims, 3 Drawing Sheets

(51) Int. Cl.
    *B29C 65/08*      (2006.01)
    *B29B 11/04*      (2006.01)
    *B29B 11/14*      (2006.01)
    *B65D 1/02*      (2006.01)
    *B65D 1/40*      (2006.01)
    *B29C 65/00*      (2006.01)
    *B32B 37/06*      (2006.01)
    *B32B 37/18*      (2006.01)
    *B29K 105/00*      (2006.01)
    *B29B 11/08*      (2006.01)
    *B29B 11/10*      (2006.01)
    *B29K 23/00*      (2006.01)
    *B29K 67/00*      (2006.01)
    *B29C 49/00*      (2006.01)
    *B29C 49/12*      (2006.01)
    *B29C 49/02*      (2006.01)
    *B29C 65/48*      (2006.01)

(52) U.S. Cl.
CPC ...... *B29C 66/1222* (2013.01); *B29C 66/1224* (2013.01); *B29C 66/131* (2013.01); *B29C 66/3452* (2013.01); *B29C 66/5344* (2013.01); *B29C 66/612* (2013.01); *B29C 66/63* (2013.01); *B29C 66/73921* (2013.01); *B29C 66/81422* (2013.01); *B29C 66/81423* (2013.01); *B29C 66/81463* (2013.01); *B29C 66/83221* (2013.01); *B32B 37/0046* (2013.01); *B32B 37/06* (2013.01); *B32B 37/18* (2013.01); *B65D 1/0207* (2013.01); *B65D 1/0223* (2013.01); *B65D 1/40* (2013.01); *B29B 11/08* (2013.01); *B29B 11/10* (2013.01); *B29B 2911/14013* (2013.01); *B29B 2911/1434* (2013.01); *B29B 2911/1448* (2013.01); *B29B 2911/14326* (2013.01); *B29B 2911/14333* (2013.01); *B29B 2911/14353* (2013.01); *B29B 2911/14373* (2013.01); *B29B 2911/14433* (2013.01); *B29B 2911/14573* (2013.01); *B29C 49/0078* (2013.01); *B29C 49/12* (2013.01); *B29C 65/48* (2013.01); *B29C 66/542* (2013.01); *B29C 66/543* (2013.01); *B29C 66/71* (2013.01); *B29C 2049/021* (2013.01); *B29K 2023/12* (2013.01); *B29K 2067/003* (2013.01); *B29K 2105/0094* (2013.01); *B29K 2105/258* (2013.01); *B29K 2995/0021* (2013.01); *B32B 2439/00* (2013.01); *Y10T 156/10* (2015.01); *Y10T 428/1397* (2015.01)

(58) Field of Classification Search
CPC ............. B29C 66/1224; B29C 66/131; B29C 66/3452; B29C 66/5344
USPC ........................................................ 156/73.1
See application file for complete search history.

(56) References Cited

U.S. PATENT DOCUMENTS

| | | | |
|---|---|---|---|
| 6,068,718 A * | 5/2000 | Medal | .................... B29C 65/08 156/309.6 |
| 6,482,347 B1 | 11/2002 | Davis et al. | |
| 2009/0239012 A1 * | 9/2009 | Thomasset | .............. B29B 11/04 428/35.7 |

FOREIGN PATENT DOCUMENTS

| | | |
|---|---|---|
| GB | 2078194 | 1/1982 |
| WO | 0108868 | 2/2001 |
| WO | 02051619 | 7/2002 |
| WO | 2011056176 | 5/2011 |

\* cited by examiner

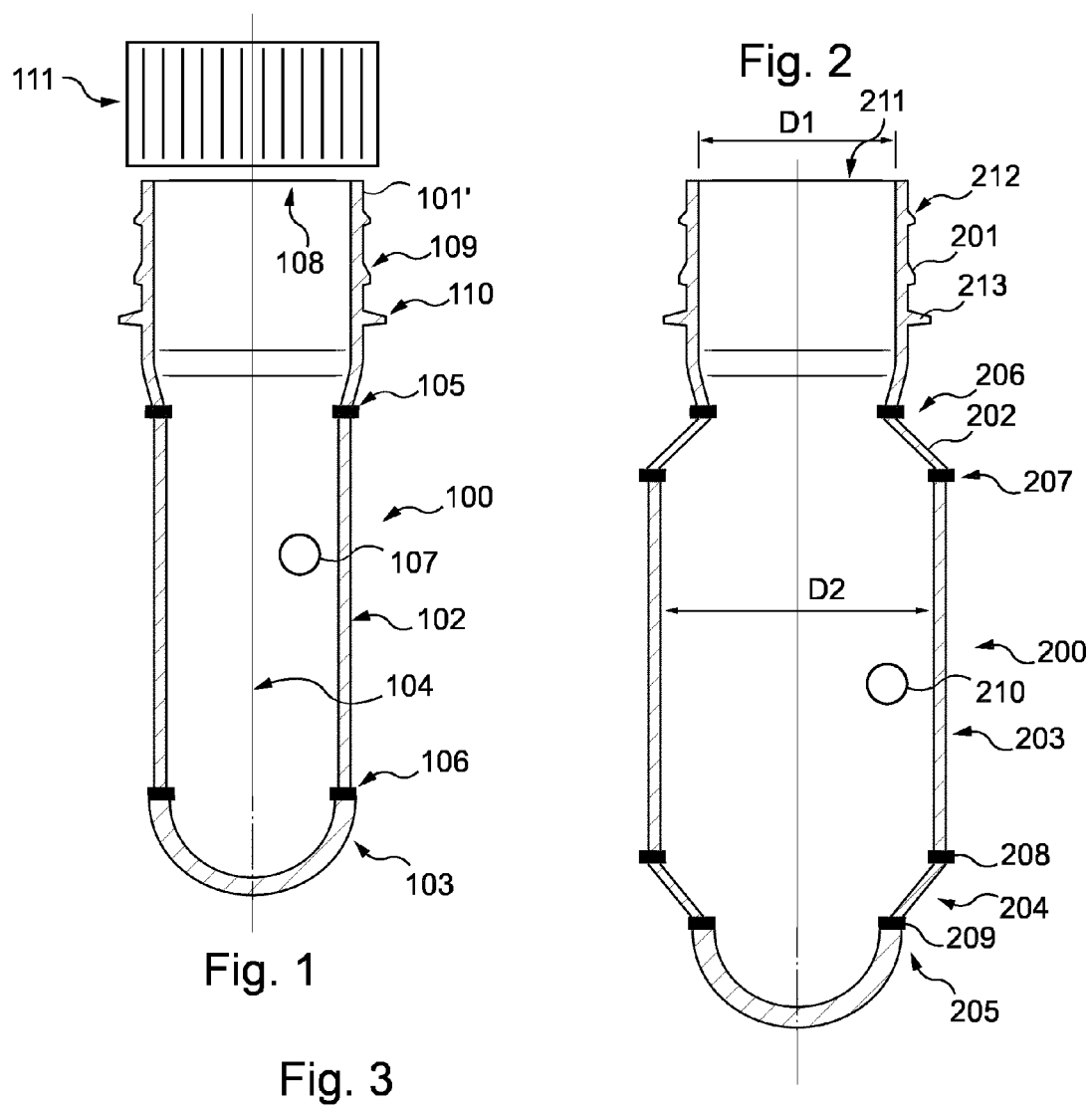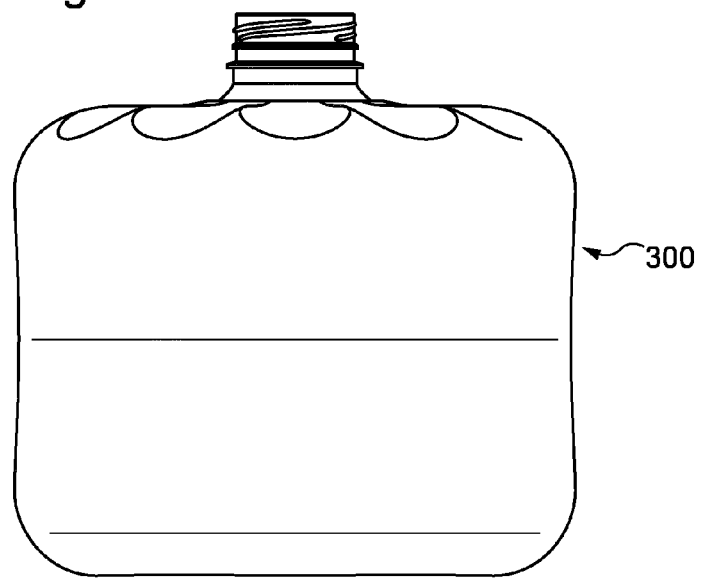

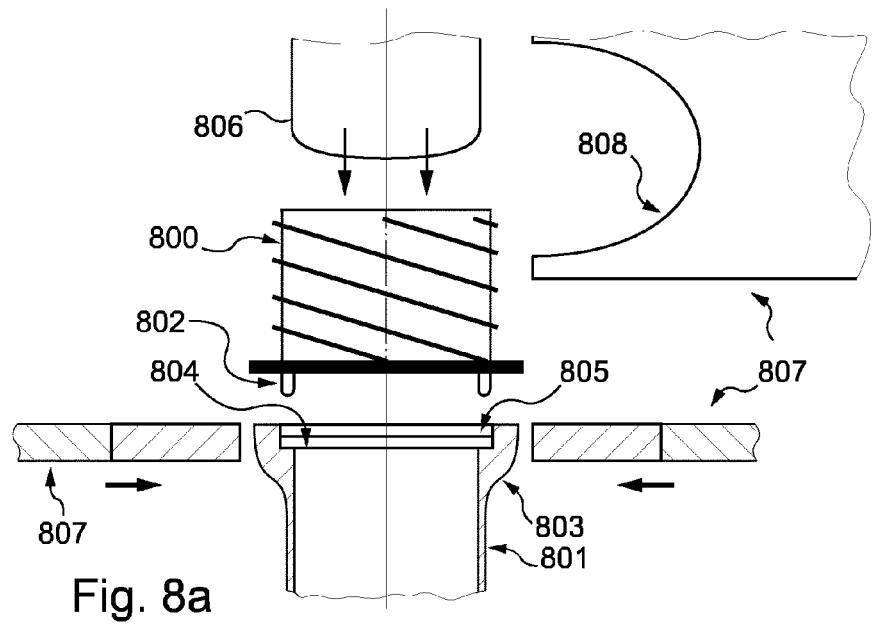
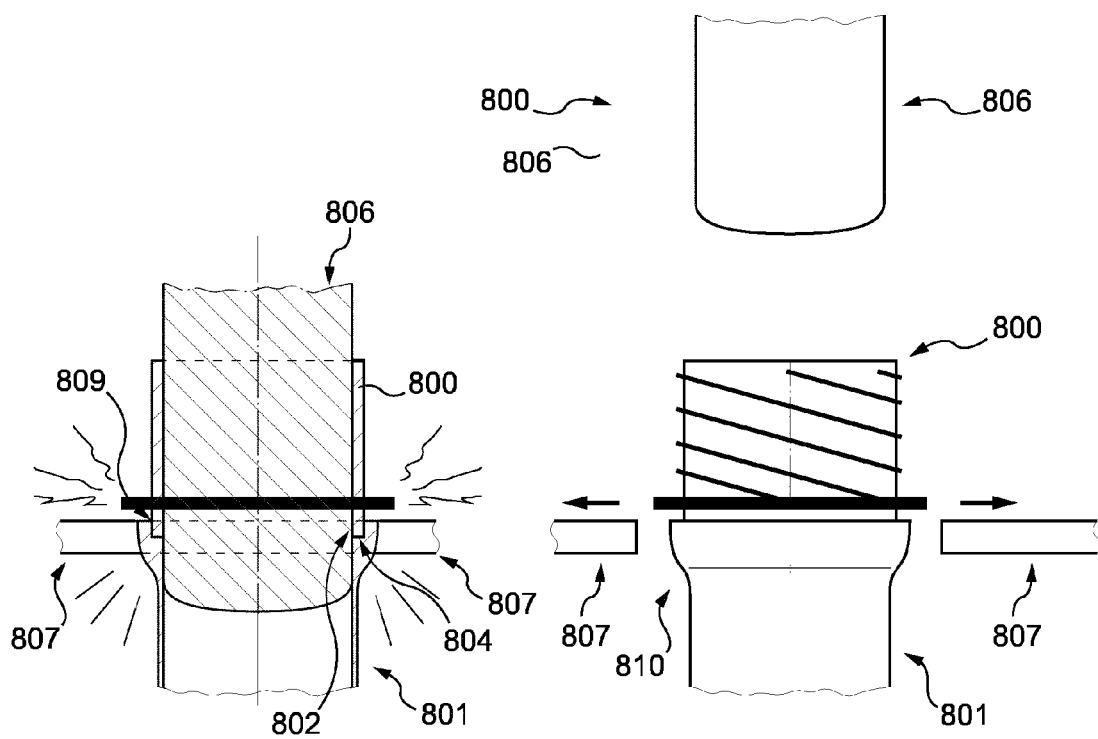
Fig. 8a
Fig. 8b
Fig. 8c

METHOD FOR THE FABRICATION OF A PREFORM, PREFORM AND CONTAINER

CROSS REFERENCE TO RELATED APPLICATIONS

The present application is a National Stage of International Application No. PCT/EP2013/065729, filed on Jul. 25, 2013, which claims priority to European Patent Application No. 12179128.9, filed Aug. 3, 2012, the entire contents of which are being incorporated herein by reference.

This invention relates to a method for the fabrication of preforms notably for use in the fabrication of containers. In a general way, it concerns the fabrication of containers, and for instance beverage containers, from preforms. This invention further relates to a preform so produced by this method and a container which is fabricated therefrom.

A well-known and commonly-employed technique in the art of fabricating containers is the method of blow-molding, wherein a mass of material is expanded to match the contours of a mold disposed about said mass. This is achieved by the injection of a working fluid, usually air, into the mass, inflating it and causing it to plastically deform.

One variant of this technique is the method of stretch blow molding. In the method of stretch blow molding, the mass is deformed in the longitudinal direction by a mechanical device known as a stretch rod, and in the radial direction by inflation. This technique is widely employed in the art of container fabrication, as it may be employed to rapidly and economically produce large quantities of containers with consistent dimensions and physical properties.

In the blow molding method and stretch blow molding method, the mass is referred to as a "preform." The preform is generally fabricated from a thermoplastic polymer, such as polypropylene (PP) or polyethylene terephthalate (PET); such plastics have the advantage of being generally inexpensive, versatile, durable, and easily-worked.

The preform has a form resembling a test tube, having a tubular body, a closed end, and an open end into which the working fluid is injected. The preform may be further provided at its open end with threads, flanges, shoulders, or other such means to facilitate the closure and/or sealing of the container fabricated therefrom.

The remainder of the preform, however, is essentially a featureless plastic tube, which deforms during the injection of the working fluid. The open end of the preform is generally not deformed during the container fabrication process, with the result that the fabrication of the neck and mouth of the finished container is substantially completed during the fabrication of the preform.

The preform is fabricated by a method of injection molding, wherein a molten plastic is injected at great pressure into a mold of the preform. This preform mold is generally composed of three segments: two which define the exterior surface of the preform and one which defines the interior surface of the preform. The molten plastic is injected through a port in the mold at or near where the closed end of the preform is formed, from which it proceeds to fill the mold cavity. Once the molding of the preform is complete, the two exterior mold segments are withdrawn, the interior mold segment extracted through the open end of the preform, and the preform is removed.

The method of fabricating preforms known in the prior art is disadvantageous in several aspects.

First, the prior art process for fabricating preforms is disadvantageous in that it requires the preform to be of a minimum thickness, generally about 2 millimeters. Injection molding components which have dimensions thinner than this induces undesirable stresses in the preform material and molding apparatus, and requires a higher injection pressure and greater injection time to complete the injection-molding process compared to components which respect this minimum. This increased process time will render the use of injection molding economically infeasible for mass production of preforms in configurations which may be otherwise ideal.

In addition, the molten plastic may solidify prematurely if it is injected into a mold cavity feature thinner than this minimum thickness, preventing the entire mold cavity from being filled.

This method of fabricating preforms is therefore disadvantageous in that it does not permit the economical mass-production of preforms with walls which are not at least 2 millimeters thick. Thus, in many cases preforms must be fabricated with more material than is strictly necessary to form the beverage container into which they will eventually be expanded, wasting material and increasing costs.

Second, the prior art process is disadvantageous in that the segment of the preform mold which defines the inside of the preform reduces the number of possible shapes that the preform may have. More specifically, the fact that a segment of the mold must be extracted from the interior of the preform via its open end means that the interior diameter of the preform at any point must never exceed the interior diameter of the open end. If not, it will be impossible to extract said mold segment from the preform. Thus, preforms which have a cross-section with an interior diameter greater than that of the open end may not be produced by the injection molding process. This limits the possible geometries of the preforms, constraining their utility and, by extension, the flexibility and utility of the containers ultimately fabricated from those preforms.

Third, the prior art process is disadvantageous in that the nature of the injection molding step requires the plastic injected to be homogeneous. In other words, each and every part of the preform must be of the same material and have the same physical properties as every other part. It is thus not possible to create, for example, a preform which is more inclined to expansion in one part than in another or one which has variations in its color or texture across its surface. This is disadvantageous in that it limits the applications in which the prior art process may be practice and reduces its overall utility and flexibility.

It is accordingly an objective of the invention to provide a method for the fabrication of preforms which embody a greater range of geometries and compositions, and which may be better conformed to the applications in which they are eventually to be used.

According to a first aspect, the invention is directed to a method for fabricating a preform, comprising the steps of providing a plurality of preform segments, each of said preform segments defining a portion of the preform; positioning said preform segments in continuous contact with each other along at least one edge of said preform segments, such that said plurality of preform segments define a cavity; and bonding each of said preform segments to at least one other preform segment such that said plurality of preform segments forms a continuous whole.

This method is advantageous in that by it one may fabricate preforms where each region of the preform is optimized according to the shape of the container which will eventually be produced from that preform. The preform is thus, as a whole, optimally configured to the form of the container which will be fabricated from it, reducing the amount of material required for the preform and reducing the cost and weight of the containers produced from them.

Furthermore, as the method permits the preform segments to be fabricated individually, each segment of the preform may be fabricated in the form and by the method which is optimal for that particular segment, and without consideration of the form of neighboring segments. This enables the fabrication of preforms which would not be feasible if only one method of fabrication was employed to fabricate a one-piece preform as in the prior art.

Additionally, the preform segments may be fabricated by a wider variety of methods than by those available for the fabrication of a one-piece preform. By this aspect of the invention, the advantages of blow molding may be realized in the fabrication of a greater variety of preforms.

Since the preform segments are fabricated individually and bonded together, there is no need for a mold portion to define the interior of the preform. The shape of the preform so fabricated may be defined without regard to the limitations of the injection-molding process. The preform made according to the method of this invention, then, may be made in shapes which are more complex and better adapted to the containers which will be formed from them than the preforms known in the art.

According to a feature of the invention, the bonding step is achieved by ultrasonic welding. Ultrasonic welding is especially suited for the fabrication of preforms, as it is quick, sanitary, and can create a hermetic seal of great strength. In this way, the invention may be practiced with greater speed and efficiency, while simultaneously augmenting the physical characteristics of the preforms so fabricated.

According to another feature of the invention, the preform segments are fabricated by injection molding or extrusion.

This is advantageous in that techniques for injection molding and extrusion, especially of the varieties of plastics known in the art of preform fabrication and container production, may be adapted to produce uniform, high-quality preform segments at high rates.

According to another feature, the inside diameter of the preform at a cross-section is greater than the inside diameter of the preform at its open end.

This is advantageous in that it permits the fabrication of preforms which may be better adapted to be expanded into certain shapes of containers, but which cannot be produced by the methods known in the art, wherein an internal mold portion has to be extracted through the open end of the preform.

According to a second aspect, the invention is directed to an apparatus for the fabrication of a preform according to the method described above.

This is advantageous in that it embodies the inventive aspects of the method described above, realizing their advantages in the fabrication of preforms for the production of containers.

According to a third aspect, the invention is directed to a preform, comprising a plurality of preform segments each defining a portion of said preform, each of which is bonded to at least one other preform segment so as to constitute said preform with a cavity defined by said plurality of preform segments.

This is advantageous in that a preform fabricated from a plurality of preform segments may be produced in a wider array of shapes and sizes than the one-piece preforms known in the art. A preform which cannot be efficiently, economically, or reliably fabricated as a single piece may be easily fabricated as a plurality of preform segments which are subsequently bonded together.

Furthermore, the preform segments may be fabricated by different techniques, each preform segment reflecting and taking advantage of the particular technique used to fabricate it. This permits the preform segments to be fabricated with optimal efficiency, reducing the cost of the preform overall. The resulting preform is thus highly adaptable to a wide variety of applications at a minimum of cost.

According to a feature, said preform comprises an open end communicating with the cavity, said open end being provided with means for interfacing with a closure device.

This is advantageous in that it permits a closure device to be attached to the container produced from the preform without any additional preparation or structure, thereby expediting the closure and sealing of the container after it has been filled. The cost of using a container fabricated from a preform according to this invention is thereby reduced.

According to another feature, the walls of the preform segments are of at least two different thicknesses.

This is advantageous in that the preform may be configured so that its thickness in any region is optimal for the degree of expansion which that region will undergo when the preform is expanded into a container.

Specifically, a thick segment may be used where a great deal of expansion is expected, and a thinner one where less is to occur. In this way, the amount of material in the preform, and by extension the weight of the container produced therefrom, may be minimized.

According to still another feature, the preform segments have at least two different intrinsic viscosities.

This is advantageous in that it results in a preform which is fabricated of preform segments of a single material, yet which behave differently when the preform is expanded into a container.

Intrinsic viscosity is a measurement of the propensity of a plastic for deformation and is a function of polymer chain length, thus two preform segments may be fabricated from the same material yet have different intrinsic viscosities and, therefore, expand to different degrees when the preform is expanded into a container.

In this way, the behavior of a preform fabricated from a plurality of preform segments may be more finely controlled during expansion into a container, while still maintaining overall uniformity of other physical characteristics.

According to still another feature, the preform segments are fabricated from at least two different materials.

This is advantageous in that the physical properties of each preform segment may be better adapted for the preform which incorporates them.

For example, it may be desired that a container is durable and resilient at its neck and base, while being soft and pliable around its midsection where it is gripped. The preform segments corresponding to these areas of the container may thus be fabricated from different materials, so as to better meet these requirements. The physical properties of the container produced from such a preform may be varied to suit the application in which it is used.

According to still another feature, the preform segments are of at least two different colors.

This is advantageous in that containers produced from the one-piece preforms known in the art must necessarily be all of one color. By fabricating a preform from preform segments of more than one color, containers may be produced therefrom which are more visually diverse and aesthetically appealing.

According to still another feature, the inside diameter of the preform at a cross-section is greater than the inside diameter of the preform at an open end of said preform.

This is advantageous in that the preform is better adapted to be expanded into containers of more and different shapes than is practicable with the preform known in the prior art.

According to still another feature, the preform comprises an open end offset from the longitudinal axis of the preform.

This is advantageous in that containers fabricated from such preforms will therefore be provided with open ends which are offset from their axes. This makes such containers easier to pour when held in the hand, especially when fabricated in larger volumes. The preform incorporating this feature may thus be better adapted to the applications in which it is to be employed.

According to still another feature, the preform further comprises at least one rib disposed upon a surface of said preform.

This is advantageous in that the addition of ribs to the preform will, after the expansion of said preform, result in a container with corresponding ribs on its surface. Such ribs serve to add strength to the container.

The thickness of the preform, and thus of the container, may be reduced overall without sacrificing the resistance of the container to external loads or the pressure of the contents contained within.

Alternately, the thickness of the preform may be maintained and the ribs added to give the resultant container greater strength than would be achievable with a preform as known in the prior art.

The preform of this invention thus renders the fabrication of preforms and containers less expensive, while simultaneously improving the suitability of said preforms and containers for the applications in which they are to be employed.

According to a fourth aspect, the invention is directed to a container fabricated from a preform according to the above description.

This is advantageous in that such a container will embody the other aspects and features of the invention. The advantages of the invention are thus realized in containers which are stronger, lighter, more economical, more versatile, and better suited to their respective applications than those known in the art.

Other particularities and advantages of the invention will also emerge from the following description.

BRIEF DESCRIPTION OF THE FIGURES

In the accompanying drawings, given by way of non-limiting examples:

FIG. 1 depicts a section view of a preform according to a first embodiment;

FIG. 2 depicts a section view of a preform according to a second embodiment;

FIG. 3 depicts a side view of a container fabricated from a preform according to the second embodiment;

FIGS. 8a through 8c depict an apparatus for the fabrication of a preform according to the method of the invention.

FIG. 1 depicts a preform according to a first embodiment of the invention. In a first step for fabrication of the preform 100 of FIG. 1 a plurality of preform segments 101-103 are provided, each of which is substantially ring-shaped and defines a portion of the preform 100. In this embodiment, the preform 100 comprises a mouth segment 101, a body segment 102, and a tail segment 103. Preferably, the preform segments 101-103 are symmetric about a longitudinal axis 104 of the preform 100.

Figure 4:
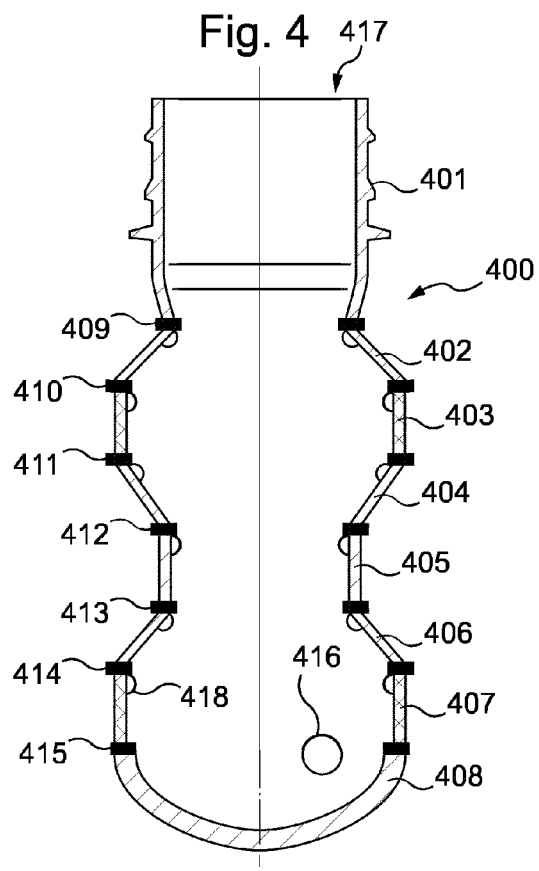
FIG. 4 depicts a section view of a preform according to a third embodiment.

In a second step for fabrication of the preform 100, the preform segments 101-103 are positioned so as to be in continuous contact with each other along at least one edge of said preform segments 101-103. In this embodiment, an edge of the mouth segment 101 is in continuous contact with an edge of the body segment 102 along a first seam 105. A second edge of the body segment 102 is in continuous contact with an edge of the tail segment 103 at a second seam 106. The arrangement of the preform segments 101-103 in this manner thus defines a cavity 107 within the preform 100 which is in communication with the open end 108.

Once positioned in contact with each other, the preform segments 101-103 are bonded to each other along the first and second seams 105 and 106, such that the preform segments 101-103 form a continuous preform 100.

This bonding step is preferably performed by ultrasonic welding, which can rapidly produce a clean, high-strength bond in food-grade plastics and is thus ideal for the fabrication of preforms for beverage containers. It should be understood, however, that other processes such as thermo-sealing or gluing may be appropriate for other applications or preform materials.

Preferably, each of the preform segments 101-103 is fabricated according to the method which is most efficient and yields the best results for that particular preform segment. For example, the mouth segment 101 is provided with threads 109 and a rim 110 for interfacing with a closure device, such as a screw-on cap 111, and is relatively thick overall; its fabrication may thus be optimally performed by injection molding. Similarly, the body segment 102 is essentially a featureless tube, and is much thinner than either the mouth segment 101 or the tail segment 103; it may be optimally fabricated by extrusion molding or similar processes. In this way, one may configure the fabrication of the preform segments 101-103 such that the properties of the resultant preform 100 are optimized.

FIG. 2 depicts a preform according to a second embodiment of the invention. The preform 200 is comprised of five preform segments: a mouth segment 201, an expansion segment 202, a body segment 203, a contraction segment 204, and a tail segment 205. As in the first embodiment depicted above, the preform segments 201-205 are positioned in continuous contact along their edges and bonded to each other along several seams 206-209 to form the preform 200. As in the first embodiment, the arrangement of the preform segments 201-205 defines the cavity 210 within the preform 200.

While the preform 200 is bonded at each of the seams 206-209, it should be understood that alternate configurations of the preform segments may require fewer bonds to fabricate a preform. The exact configurations of the preform segments and the seams at which they are bound to each other may be optimized for a particular application.

The cylindrically-shaped body segment 203 is of a greater diameter than the mouth segment 201 and tail segment 205, and as such cannot be bonded to them directly. The expansion and contraction segments 202 and 204 are thus in the shape of conical frustums, permitting the body segment 203 to be connected to the mouth and tail segments 201 and 205.

The method of fabricating a preform of the invention permits one to fabricate a preform where the diameter at any section of the preform is not constrained by the diameter of the preform at its open end. In FIG. 2, the preform 200 has a diameter $D_1$ at its open end 211 which is smaller than the diameter D2 at the body segment 203.

The preform segments may be configured so as to be of different thicknesses. Preform segments which will undergo a high degree of expansion (especially radial expansion) when the preform is fabricated into a container may be made with thick walls. Preform segments corresponding to areas of the finished container where high degrees of strength will be required may also be made with thick walls. Conversely, preform segments corresponding to areas of low expansion may be made with thin walls. In this way, the amount of material used to fabricate the preform may be minimized.

FIG. 2 shows that the mouth segment 201 and the tail segment 205 are fabricated so as to be thicker than the expansion, body, and contraction segments 202-204. When the preform 200 is expanded into a container, the tail segment 204 will undergo a great deal of radial expansion, necessitating its increased thickness. The mouth segment 201 will not undergo expansion, but as it comprises the threads 212 and rim 213 to which a closure device will be affixed, it is advantageously made with additional thickness to give it improved strength. This is especially advantageous in containers for carbonated beverages and other substances under pressure.

FIG. 3 depicts a container fabricated from the preform of FIG. 2. The container 300 is of a large diameter. The use of expansion and contraction segments 202 and 204 in the preform, as depicted in FIG. 3, permit the fabrication of a container 300 with a larger diameter than might otherwise be feasible with the methods known in the prior art.

FIG. 4 depicts a preform according to a third embodiment of the invention. The preform 400 is fabricated from eight preform segments 401-408, which are disposed in contact with each other as shown and bonded along their edges at several seams 409-415. The resultant preform 400 is thus provided with a cavity 416 in communication with an open end 417. The preform 400 is in a shape substantially resembling an hourglass, which when expanded will yield a substantially hourglass-shaped container.

The preform segments 401-408 are further provided with ribs 418 upon their internal surfaces. These ribs 418 serve to add additional structural strength and resistance to the container fabricated from the preform 400.

While FIG. 4 depicts an example of a preform in an hourglass shape, the method of the invention permits many other shapes, textures and contours to be realized in preforms, and by extension in containers. The invention thus offers a greatly increased variety of possible container shapes and sizes.

Furthermore, the fabrication of preforms from multiple preform segments permits the material properties of each preform segment to be chosen individually. In FIG. 4, two body segments 403 and 407 are fabricated from a differently-colored plastic than the rest of the segments of the preform 400. In a variation, the preforms may include preform segments fabricated from different materials. In another variation, the preform segments may be fabricated from plastics comprised of the same type of polymer but with different intrinsic viscosities. This results in preforms which are more disposed to deformation in certain regions than in others, but whose physical properties are otherwise uniform. In this way, the present invention greatly increases the flexibility and adaptability of the preforms used in the blow-molding process and, by extension, the variety of containers which may be so produced.

Figure 5:
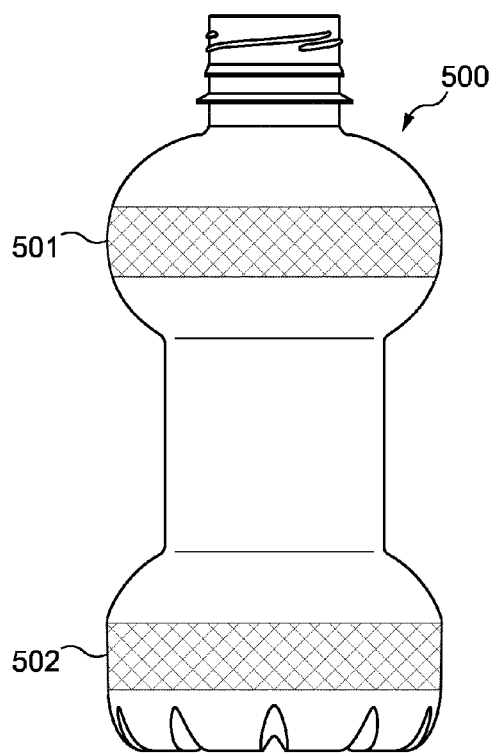
FIG. 5 depicts a side view of a container fabricated from a preform according to the third embodiment.

FIG. 5 depicts a container fabricated from the preform of FIG. 4. The container 500 is generally hourglass-shaped, corresponding to the shape of the preform 400 of FIG. 4. The container 500 is further provided with two contrasting-color bands 501 and 502, corresponding to the body segments 403 and 407 depicted in FIG. 4.

Figure 6:
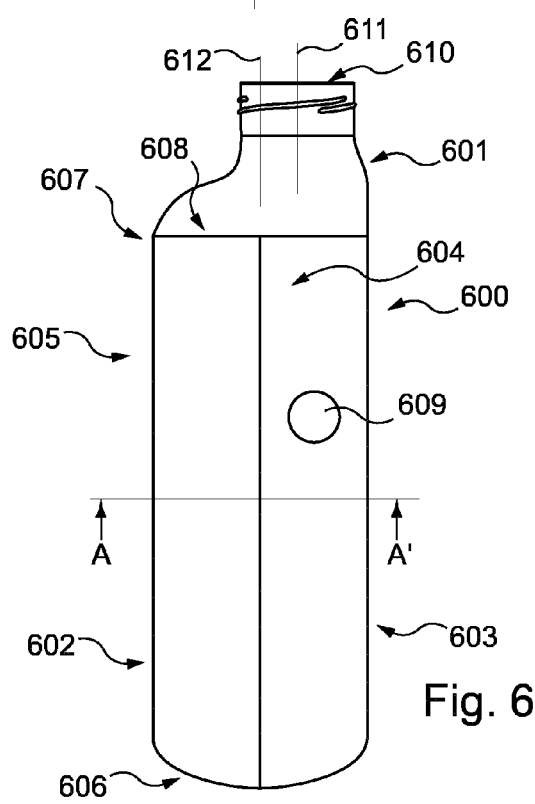
FIG. 6 depicts a side view of a preform according to a fourth embodiment.

FIG. 6 depicts a preform according to a fourth embodiment of the invention. The preform 600 is fabricated from three preform segments: a substantially ring-shaped neck segment 601, and two body segments 602 and 603. The body segments 602 and 603 are substantially identical, and are bonded along a longitudinal seam 604 to create a preform body 605 which is substantially tubular and closed at a first end 606. The neck segment 601 is bonded to the preform body 605 at a second end 607, along a circumferential seam 608, thereby producing the preform 600 which defines a cavity 609.

The neck segment 600 is provided with a mouth 610 with a centerline 611. The preform mouth centerline 611 is offset from the preform body centerline 612, which is shown in greater detail in Section A-A of FIG. 7.

Figure 7:
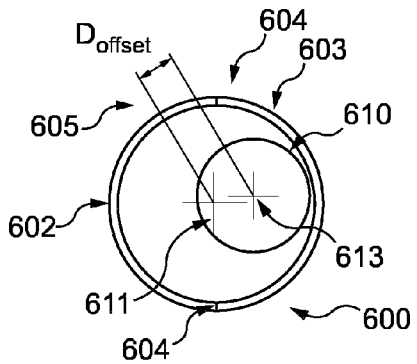
FIG. 7 depicts a removed section view of a preform according to the fourth embodiment.

FIG. 7 is a section view of the cavity 609 of the preform 600, looking towards the inside surface of the neck segment 601. The mouth 610 has a mouth center 613 which corresponds to the preform mouth centerline 611 of FIG. 6. The preform body 605 has a body center 614, likewise corresponding to the preform body centerline 612 of FIG. 6. The mouth and body centers 613 and 614 are offset from each other with the offset distance $D_{offset}$.

When the preform 600 according to this embodiment is fabricated into a container, the resulting container will have a neck which is offset from the overall centerline of the container. Such a container will be easier to pour, especially in large capacities.

FIGS. 8a through 8c depicts an apparatus for fabricating a preform according to the method described above. More specifically, FIGS. 8a through 8c depict the disposition of the apparatus before, during, and after a step for bonding of two preform segments by ultrasonic welding.

FIG. 8a depicts the apparatus before a step for bonding two preform segments. An upper segment 800 and lower segment 801 are provided. The upper segment 800 is provided with a mating flange 802, while the lower segment 801 is provided with a shoulder 803 and counterbore 804 configured to accept the mating flange 802 of the upper segment 800.

Furthermore, disposed on the lateral surface of the counterbore 804 of the lower segment 801 is a force concentrator 805. The force concentrator 805 is ideally configured as a circumferential ridge of triangular cross-section, though it may instead be advantageous to provide a force concentrator in other sizes, dispositions, or cross-sections than depicted here.

Preferably, when the mating flange 802 of the upper segment 800 is inserted into the counterbore 804 of the lower segment 801, the force concentrator 805 will create a mild interference fit with the mating flange 802. This will serve to hold the two segments 800 & 801 together prior to the bonding step, facilitating their handling and bonding in a production environment.

The apparatus is provided with an ultrasonic anvil 806 and two ultrasonic horns 807. The ultrasonic anvil 806 is substantially rod-shaped, while the ultrasonic horns 807 are configured as plates with semicircular cutouts 808. The semicircular cutouts 808 are preferably configured to substantially match the lower segment 801 at the shoulder 803, though it should be understood that providing ultrasonic anvil and horns in other configurations may be preferable for other embodiments.

FIG. 8b depicts the apparatus during the bonding step. The upper segment 800 is inserted into the lower segment 801, such that the mating flange 802 is disposed within the counterbore 804. The ultrasonic anvil 806 has been advanced into the upper segment 800 and the ultrasonic horns 807 have been advanced laterally into the lower segment 801, thereby pressing the two segments 800 & 801 together at the interface 809 between the two. The ultrasonic horns 807 are made to vibrate at ultrasonic frequencies, thereby generating heat from friction which causes the upper and lower segments to melt together and be bonded.

FIG. 8c depicts the apparatus after the bonding step has been completed. The preform segments 800 & 801 have been bonded together, yielding a continuous single piece 810. The ultrasonic anvil 806 and horns 807 are retracted, and the process may be repeated for another pair of preform segments.

Of course, the invention is not limited to the embodiments described above and in the accompanying embodiments. Modifications remain possible, particularly as to the construction of the various elements or the substitution of technical equivalents, without departing from the scope of protection of the invention.

In particular, it should be noted that the configuration and arrangement of the preform segments is not limited to the examples given and minor variations thereof. Preform segments in configurations other than the ring-shaped and longitudinally-split variations described above remain possible, and will permit the fabrication of many different types of preforms not described in this document but nonetheless within the scope of the invention.

The exact configuration of the invention as practiced may thus vary from the foregoing description without departing from the inventive principle disclosed therein. Accordingly, the scope of this disclosure is intended to be exemplary rather than limiting, and the scope of the invention is defined by any claims that stem at least in part from it.

The invention claimed is:

1. A method for fabricating a preform, the method comprising:
providing a plurality of preform segments, each of the plurality of preform segments defining a portion of a preform, the plurality of preform segments comprises a mouth segment, a tail segment, and at least one additional segment selected from the group consisting of an expansion segment and a contraction segment;
positioning the plurality of preform segments in continuous contact with each other along at least one edge of the plurality of preform segments, such that the plurality of preform segments define a cavity; and
bonding each of the plurality of preform segments to at least one other of the plurality of preform segments such that the plurality of preform segments forms a continuous whole.

2. The method according to claim 1, wherein the bonding step is achieved by ultrasonic welding.

3. The method according to claim 1, wherein the plurality of preform segments is fabricated by injection molding or extrusion.

4. The method according to claim 1, wherein an inside diameter of the preform at a cross-section is greater than an inside diameter of the preform at an open end of the preform.

5. The method according to claim 1, wherein the at least one additional segment has a shape of a conical frustum, permitting a body segment to be connected to the mouth segment and the tail segment.

\* \* \* \* \*